(12) United States Patent
Yoshimine et al.

(10) Patent No.: US 9,252,450 B2
(45) Date of Patent: Feb. 2, 2016

(54) FUEL CELL STACK

(75) Inventors: Yuki Yoshimine, Wako (JP); Tadashi Tsunoda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 168 days.

(21) Appl. No.: 13/989,620

(22) PCT Filed: Feb. 20, 2012

(86) PCT No.: PCT/JP2012/054679
§ 371 (c)(1),
(2), (4) Date: May 24, 2013

(87) PCT Pub. No.: WO2012/117982
PCT Pub. Date: Sep. 7, 2012

(65) Prior Publication Data
US 2013/0244130 A1    Sep. 19, 2013

(30) Foreign Application Priority Data

Mar. 2, 2011    (JP) ................................ 2011-044564

(51) Int. Cl.
*H01M 8/24*    (2006.01)
*H01M 8/02*    (2006.01)
*H01M 8/12*    (2006.01)

(52) U.S. Cl.
CPC .......... *H01M 8/2465* (2013.01); *H01M 8/0271* (2013.01); *H01M 8/0276* (2013.01); *H01M 8/248* (2013.01); *H01M 8/2425* (2013.01); *H01M 8/2485* (2013.01); *H01M 2008/1293* (2013.01); *Y02E 60/50* (2013.01)

(58) Field of Classification Search
CPC ................... H01M 2008/1293; H01M 8/0276; H01M 8/2071; H01M 8/2465
See application file for complete search history.

(56) References Cited

U.S. PATENT DOCUMENTS

| 5,084,364 | A | 1/1992 | Quaadvliet |
| 7,670,710 | B2 | 3/2010 | Tsunoda |
| 8,323,853 | B2 | 12/2012 | Ogawa et al. |

(Continued)

FOREIGN PATENT DOCUMENTS

| JP | 03-057162 | 3/1991 |
| JP | 2005-183079 | 7/2005 |

(Continued)

OTHER PUBLICATIONS

Japanese Office Action, JP Application No. 2011-044563 corresponding to co-pending U.S. Appl. No. 13/989,627 with partial English translation, dated Sep. 16, 2014, 4 pages.
Co-pending U.S. Appl. No. 13/989,627, filed May 24, 2013.
European Office Action dated Feb. 26, 2015, 6 pages.
U.S. Office Action dated Sep. 10, 2015 from co-pending U.S. Appl. No. 13/989,627, 22 pages.

*Primary Examiner* — Milton I Cano
*Assistant Examiner* — Andy Chen
(74) *Attorney, Agent, or Firm* — Rankin, Hill & Clark LLP

(57) ABSTRACT

A fuel cell stack includes a first separator. The first separator includes a sandwiching section for sandwiching an electrolyte electrode assembly, a fuel gas supply section in which a fuel gas supply passage is formed, and a first load absorbing mechanism. The first load absorbing mechanism includes coupling members and seal members. The coupling members couple fuel gas supply sections of a pair of the first separators together, and have spring property. The seal members seal the fuel gas supply section.

10 Claims, 14 Drawing Sheets

(56) References Cited

U.S. PATENT DOCUMENTS

| | | |
|---|---|---|
| 2004/0209127 A1 | 10/2004 | Wang et al. |
| 2005/0136294 A1 | 6/2005 | Tsunoda |
| 2006/0134499 A1 | 6/2006 | Homma |
| 2007/0116998 A1 | 5/2007 | Kuznecov et al. |
| 2008/0096085 A1 | 4/2008 | Tsunoda |
| 2009/0305104 A1 | 12/2009 | Matsumoto et al. |
| 2009/0311573 A1 | 12/2009 | Dan |
| 2011/0003230 A1 | 1/2011 | Ozgur |
| 2011/0151348 A1 | 6/2011 | Murakami et al. |

FOREIGN PATENT DOCUMENTS

| | | |
|---|---|---|
| JP | 2006-120589 | 5/2006 |
| JP | 2006-179283 | 7/2006 |
| JP | 2006-339035 | 12/2006 |
| JP | 2007-317490 | 12/2007 |
| JP | 2008-041303 | 2/2008 |
| JP | 2008-103210 | 5/2008 |
| JP | 2008-103211 | 5/2008 |
| JP | 4087216 | 5/2008 |
| JP | 4291299 | 7/2009 |
| JP | 2010-067453 | 3/2010 |

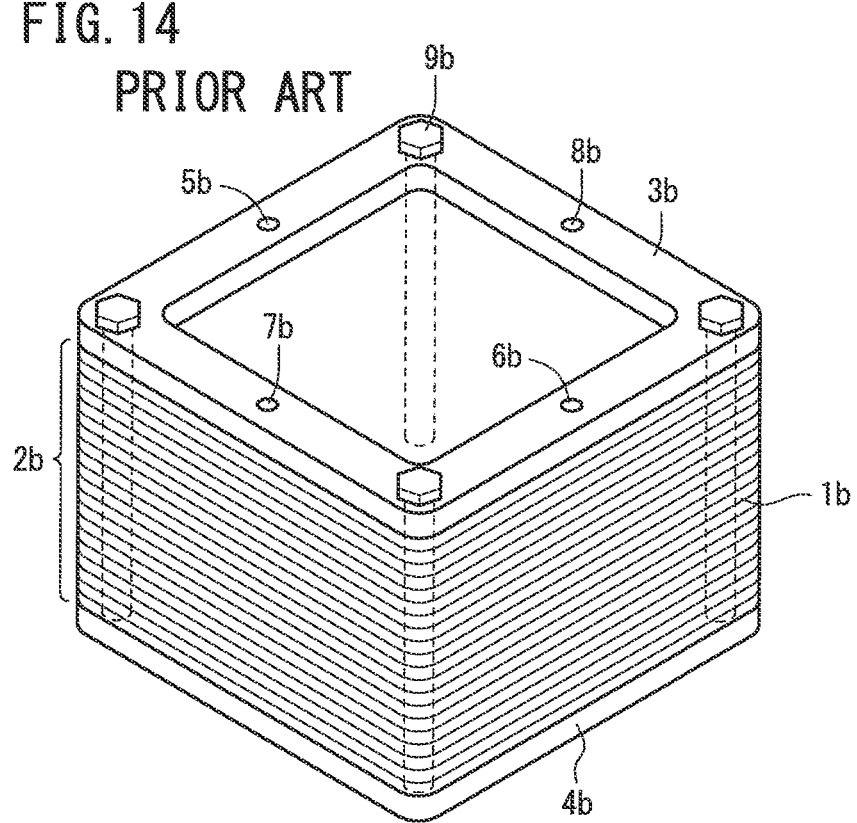

FUEL CELL STACK

TECHNICAL FIELD

The present invention relates to a fuel cell stack formed by stacking a plurality of fuel cells. Each of the fuel cells is formed by sandwiching an electrolyte electrode assembly between a first separator and a second separator. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (MEA). The electrolyte electrode assembly is interposed between separators (bipolar plates). In use, predetermined numbers of the electrolyte electrode assemblies and the separators are stacked together to form a fuel cell stack.

In the fuel cell, it is required to supply a fuel gas (e.g., hydrogen-gas) to the anode of the electrolyte electrode assembly and an oxygen-containing gas (e.g., the air) to the cathode of the electrolyte electrode assembly. The fuel gas and the oxygen-containing gas also need to be supplied to each of the fuel cells.

As the fuel cell of this type, for example, a flat plate type solid oxide fuel cell as disclosed in Japanese Patent No. 4291299 (hereinafter referred to as Conventional Technique 1) is known. The fuel cell includes, as shown in FIG. 13, a cell stack 1a, and four manifolds M1 to M4 provided around the cell stack 1a. The manifolds M1 to M4 supply, and discharge the fuel gas and the oxygen-containing gas to and from each of unit cells 2a. In the fuel cell, a pressure is applied to the cell stack 1a by a first pressure applying mechanism 3a, and a pressure is applied to each of the manifolds M1 to M4 by a second pressure applying mechanism 4a.

The cell stack 1a is formed by stacking the unit cells 2a and interconnectors 5a alternately. The manifold M1 serves as a fuel gas supply manifold for supplying the fuel gas to the cell stack 1a, and the manifold M2 serves as a discharge manifold for discharging the fuel gas from the cell stack 1a. The manifold M3 serves as an oxygen-containing gas supply manifold for supplying the oxygen-containing gas to the cell stack 1a, and the manifold M4 serves as a discharge manifold for discharging the oxygen-containing gas from the cell stack 1a.

The first pressure applying mechanism 3a includes a holder plate 6a and a compression spring 7a provided on the cell stack 1a. The second pressure applying mechanism 4a includes compression springs 8a provided on the manifolds M1 to M4.

Further, as shown in FIG. 14, a solid oxide fuel cell stack disclosed in Japanese Laid-Open Patent Publication No. 2007-317490 (hereinafter referred to as Conventional Technique 2) includes a stack body 2b formed by stacking a plurality of solid oxide fuel cells 1b in a stacking direction, and a pair of outer support members 3b, 4b provided on both sides of the stack body 2b in the stacking direction.

The fuel cell stack has a fuel gas supply hole 5b for supplying the fuel gas, a fuel gas discharge hole 6b for discharging the fuel gas, an air supply hole 7b for supplying the air, and an air discharge hole 8b for discharging the air. The holes 5b to 8b in the fuel cell stack make up an internal manifold.

Bolts 9b are tightly screwed into nuts (not shown) to tighten the outer support members 3b, 4b inwardly in the stacking direction. Thus, the stack body 2b is pressed inwardly by the outer support members 3b, 4b, and components of the fuel cell stack are fixed together.

Further, a seal structure body disclosed in Japanese Patent No. 4087216 (hereinafter referred to as Conventional Technique 3) is known. In the conventional technique 3, an electrolyte membrane and an air electrode are successively stacked on a fuel electrode made of ceramic material containing metal, and a stainless steel separator is provided on the outer peripheral region of the electrolyte membrane to form the seal structure body for a low-temperature operation type solid oxide fuel cell. By grinding the circumferential side surface of the fuel electrode, at the circumferential side surface of the fuel electrode, the metal is expanded and exposed from the material forming the fuel electrode itself. The circumferential side surface of the fuel electrode where the metal is expanded and exposed, the circumferential side surface of the electrolyte membrane, and the lower surface of the separator are brazed to each other using metal brazing material.

SUMMARY OF INVENTION

The SOFC is operated at considerably high temperature. Therefore, it takes long time to launch the fuel cell into steady power generation. Therefore, it is desired to reduce the time required for starting the operation of the fuel cell. For this purpose, in particular, at the time of starting operation, the temperature of the fuel cell could be raised rapidly. However, in this case, temperature difference may occur between components or portions of the fuel cell, and rapid distortion or deformation may occur by heat displacement easily.

In this regard, in the conventional technique 1, the cell stack 1a is tightened by the first pressure applying mechanism 3a, and the manifolds M1 to M4 are tightened by the second pressure applying mechanism 4a. In the structure, components such as the interconnectors 5a (separators) and the MEAs may be damaged undesirably.

Further, in the conventional technique 2, when the temperature of the fuel cell stack is raised rapidly, if rapid displacement occurs, since the stack body 2b is pressed inwardly by the outer support members 3b, 4b using the bolts 9b, distortion cannot be absorbed (relaxed). Thus, the stack body 2b tends to be deformed easily.

Further, in the conventional technique 3, when the temperature of the fuel cell is raised rapidly, if rapid displacement occurs, the portion brazed using metal brazing material may be undesirably damaged due to distortion caused by such rapid displacement.

The present invention has been made to solve the problems of this type, and an object of the present invention is to provide a fuel cell stack which makes it possible to reliably absorb heat displacement caused by rapid increase in the temperature of fuel cells, and prevent deformation of separators as much as possible.

The present invention relates to a fuel cell stack formed by stacking a plurality of fuel cells in a stacking direction. Each of the fuel cells is formed by sandwiching an electrolyte electrode assembly between a first separator and a second separator. The electrolyte electrode assembly includes an anode, a cathode, and an electrolyte interposed between the anode and the cathode.

At least the first separator includes a sandwiching section, a reactant gas supply section, and a load absorbing mechanism. The sandwiching section sandwiches the electrolyte electrode assembly. A reactant gas channel for supplying a reactant gas along an electrode surface is formed in the sandwiching section. A reactant gas supply passage for supplying the reactant gas to the reactant gas channel extends through the reactant gas supply section in the stacking direction. The load absorbing mechanism is provided in the reactant gas supply section for absorbing a load applied in the stacking direction.

The load absorbing mechanism includes a pair of coupling members for coupling a pair of the fuel gas supply sections that are adjacent to each other in the stacking direction and through which the reactant gas flows, and the coupling members have spring property for absorbing the load applied in the stacking direction. Further, the load absorbing mechanism includes a seal member for preventing leakage of the reactant gas from the reactant gas supply section.

In the present invention, in the load absorbing mechanism, the reactant gas supply sections that are adjacent to each other in the stacking direction are joined to each other together with the seal member by the coupling members having spring property. In the structure, since the coupling members are flexibly deformed, the displacement amount in the stacking direction is absorbed effectively. Thus, a desired sealing performance is achieved, and rapid displacement caused when the temperature is raised rapidly can be absorbed effectively. Therefore, distortion in the separator is suppressed, and damage of the reactant gas supply section can be prevented as much as possible.

Further, the load in the stacking direction can be absorbed by flexible deformation of the coupling members. Thus, dimension errors in the stacking direction of the separator can be absorbed suitably.

The above and other objects, features, and advantages of the present invention will become more apparent from the following description when taken in conjunction with the accompanying drawings in which preferred embodiments of the present invention is shown by way of illustrative example.

BRIEF DESCRIPTION OF DRAWINGS

FIG. 14 is a perspective view showing a solid oxide fuel cell stack according to Conventional Technique 2.

DESCRIPTION OF EMBODIMENTS

Figure 1:
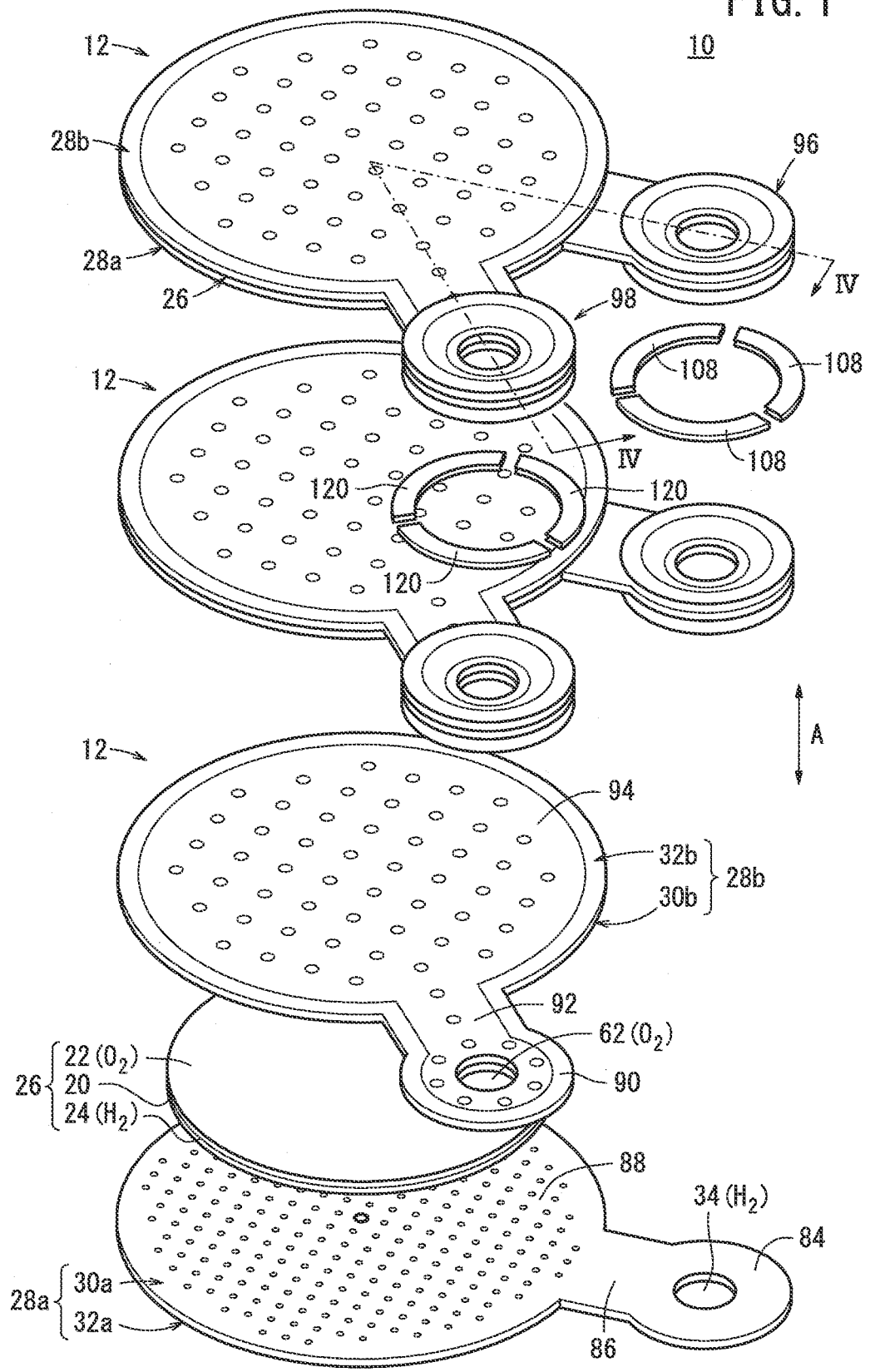
FIG. 1 is an exploded perspective view showing a fuel cell stack according to a first embodiment of the present invention.
Figure 2:
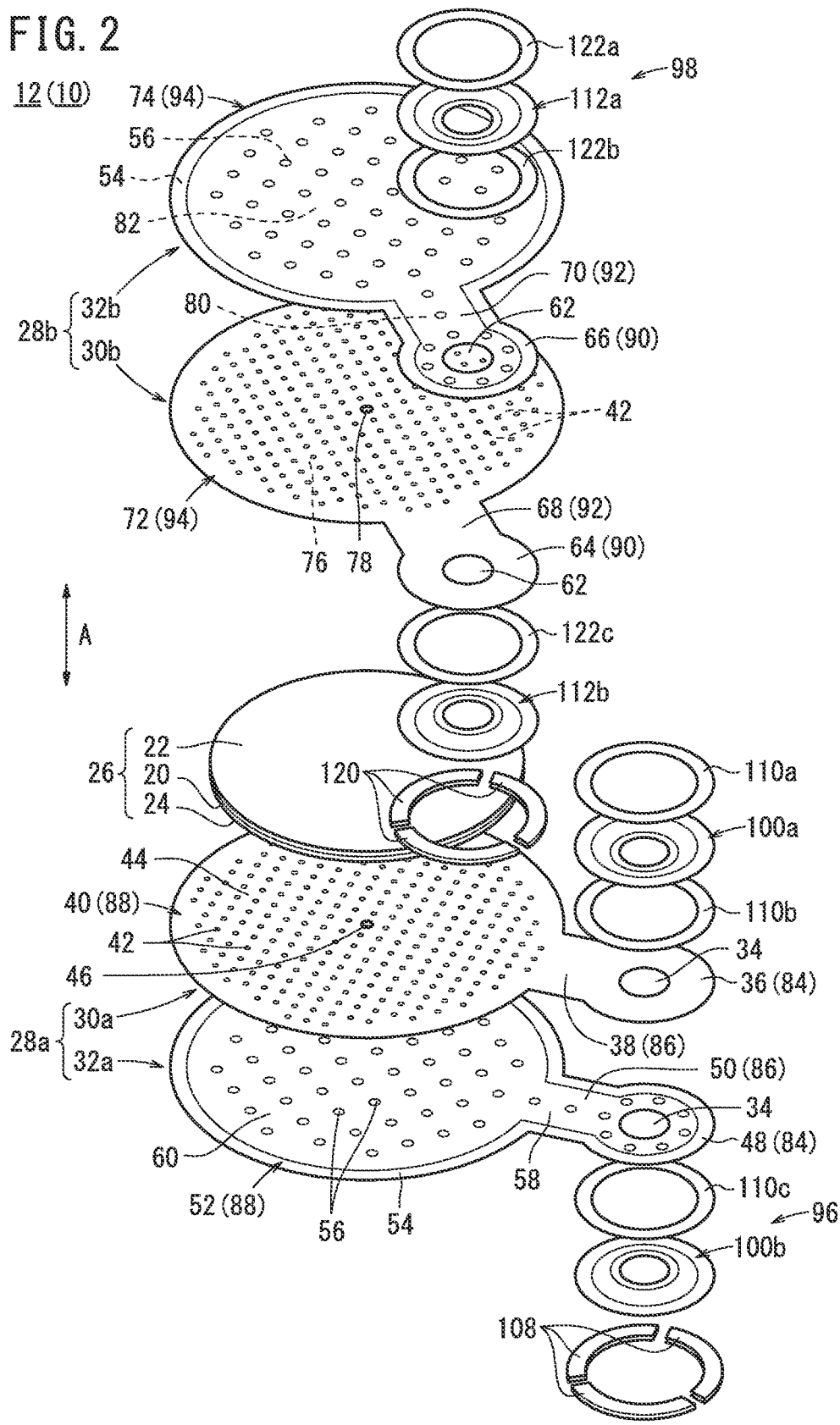
FIG. 2 is an exploded perspective view showing a fuel cell of the fuel cell stack.

As shown in FIGS. 1 and 2, a fuel cell stack 10 according to a first embodiment of the present invention is formed by stacking a plurality of fuel cells 12 in a direction indicated by an arrow A. The fuel cell stack 10 is used in various applications, including stationary and mobile applications. For example, the fuel cell stack 10 is mounted on a vehicle.

Figure 3:
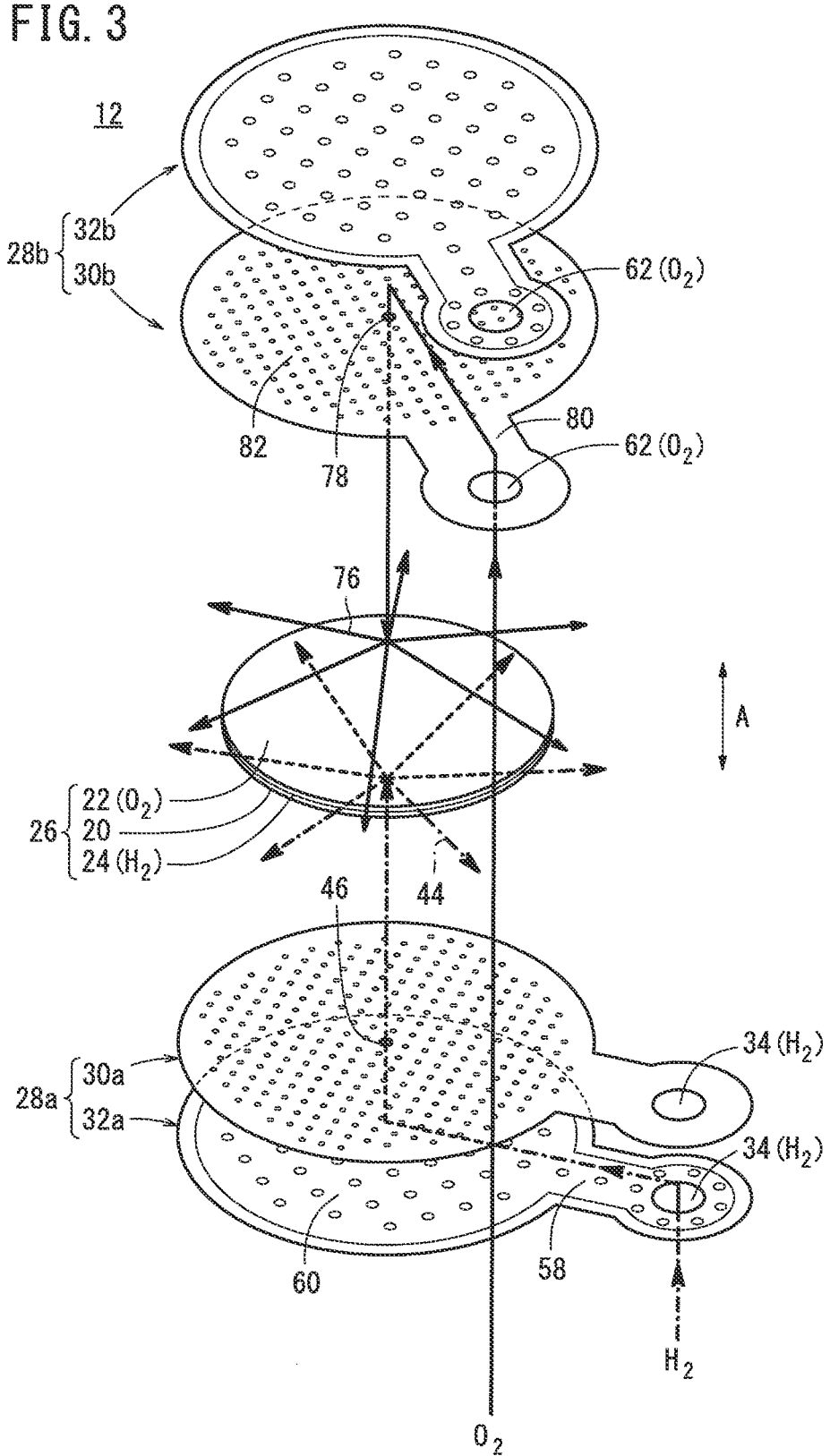
FIG. 3 is a view showing flows of reactant gases in the fuel cell stack.

The fuel cell 12 is a solid oxide fuel cell. As shown in FIGS. 1 to 3, the fuel cell 12 includes an electrolyte electrode assembly (MEA) 26. The electrolyte electrode assembly 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. A barrier layer (not shown) is provided at least at the outer circumferential edge of the electrolyte electrode assembly 26 for preventing entry of exhaust gas (off gas) i.e., the oxygen-containing gas and the fuel gas after consumption in power generation reaction.

The fuel cell 12 is formed by sandwiching one electrolyte electrode assembly 26 between a first separator 28a and a second separator 28b. The first separator 28a and the second separator 28b comprise separator bodies having the same shape, and reversed 180° oppositely to each other.

The first separator 28a includes a first plate 30a and a second plate 32a. The first and second plates 30a, 32a are metal plates of, e.g., stainless steel. For example, the first plate 30a and the second plate 32a are joined to each other by diffusion bonding, laser welding, brazing, or the like.

The first plate 30a has a substantially flat plate, and includes a first fuel gas supply section (reactant gas supply section) 36. A fuel gas supply passage (reactant gas supply passage) 34 extends through the fuel gas supply section 36 for supplying the fuel gas (one fuel gas) in the stacking direction indicated by the arrow A. The first fuel gas supply section 36 is integral with a first sandwiching member 40 through a first bridge 38 extending outwardly from the first fuel gas supply section 36.

The first sandwiching member 40 and the electrolyte electrode assembly 26 have the same size, or the diameter of the first sandwiching member 40 is larger than the diameter of the electrolyte electrode assembly 26. A plurality of projections 42 are formed on a surface of the first sandwiching member 40 which contacts the anode 24. A fuel gas channel (reactant gas channel) 44 for supplying the fuel gas along the electrode surface of the anode 24 is formed by the projections 42. The projections 42 have a current collection function. A fuel gas inlet 46 for supplying the fuel gas to a central region of the anode 24 is formed at the center of the first sandwiching member 40.

The second plate 32a has a second fuel gas supply section (reactant gas supply section) 48, and the fuel gas supply passage 34 extends through the second fuel gas supply section 48. The second fuel gas supply section 48 is integral with a second sandwiching member 52 through a second bridge 50, extending outwardly from the second fuel gas supply section 48. A circumferential ridge 54 is provided annularly on an outer circumferential portion of the second plate 32a. The circumferential ridge 54 protrudes toward the first plate 30a, and the circumferential ridge 54 is joined to the first plate 30a.

A plurality of protrusions 56 are formed on surfaces of the second fuel gas supply section 48, the second bridge 50, and the second sandwiching member 52 facing the first plate 30a. The protrusions 56 contact the first plate 30a to prevent collapsing due to a load applied in the stacking direction.

A fuel gas supply channel (reactatn gas supply channel) 58 connected to the fuel gas supply passage 34 is formed between the first bridge 38 and the second bridge 50. The fuel gas supply channel 58 is connected to the fuel gas inlet 46 through a fuel gas filling chamber 60 formed between the first and second sandwiching members 40, 52.

The first separator 28a and the second separator 28b have the same shape. The second separator 28b includes a first plate 30b and a second plate 32b corresponding respectively to the first plate 30a and the second plate 32a. The first plate 30b and the second plate 32b have first and second oxygen-containing gas supply sections (reactant gas supply sections) 64, 66. An oxygen-containing gas supply passage (reactant gas supply passage) 62 extends through the first and second oxygen-containing gas supply sections 64, 66 for supplying the oxygen-containing gas (the other reactant gas) in the stacking direction.

In the first plate 30b and the second plate 32b, the first and second oxygen-containing gas supply sections 64, 66 are integral with first and second sandwiching members 72, 74 through first and second bridges 68, 70 extending outwardly from the first and second oxygen-containing gas supply sections 64, 66, respectively.

On the surface of the first sandwiching member 72 which contacts the cathode 22, an oxygen-containing gas channel (reactant gas channel) 76 for supplying an oxygen-containing gas along the electrode surface of the cathode 22 is formed by the projections 42. An oxygen-containing gas inlet 78 for supplying the oxygen-containing gas to a central region of the cathode 22 is formed at the center of the first sandwiching member 72.

The second plate 32b is joined to the first plate 30b to form an oxygen-containing gas supply channel 80 between the first and second bridges 68, 70. The oxygen-containing gas supply channel 80 is connected to the oxygen-containing gas supply passage 62. An oxygen-containing gas filling chamber (reactant gas filling chamber) 82 is formed in the second sandwiching member 74. The oxygen-containing gas supply passage 62 is connected to the oxygen-containing gas filling chamber 82 through the oxygen-containing gas supply channel 80.

As shown in FIG. 1, in the first separator 28a, the first and second fuel gas supply sections 36, 48 form a fuel gas supply section (reactant gas supply section) 84, the first and second bridges 38, 50 form a bridge section 86, and the first and second sandwiching members 40, 52 form a sandwiching section 88. In the second separator 28b, the first and second oxygen-containing gas supply sections 64, 66 form an oxygen-containing gas supply section (reactant gas supply section) 90, and the first and second bridges 68, 70 form a bridge section 92, and the first and second sandwiching members 72, 74 form a sandwiching section 94.

At each of the fuel gas supply sections 84 of the pair of the first separators 28a that are adjacent to each other in the stacking direction indicated by the arrow A, a first load absorbing mechanism (fuel gas side load absorbing mechanism) 96 for absorbing the load in the stacking direction is provided, and at each of the oxygen-containing gas supply sections 90 of the pair of the second separators 28b that are adjacent to each other in the stacking direction indicated by the arrow A, a second load absorbing mechanism (oxygen-containing gas side load absorbing mechanism) 98 for absorbing the load in the stacking direction is provided.

Figure 4:
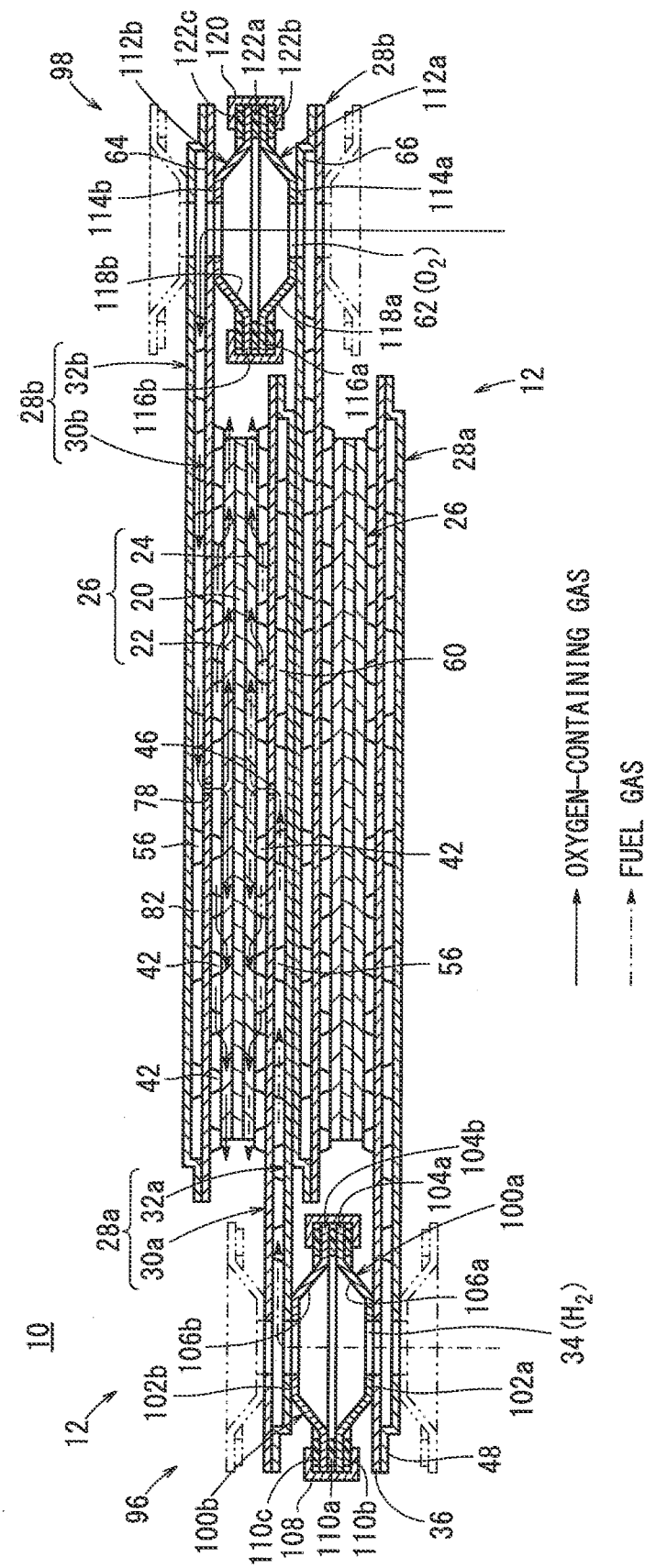
FIG. 4 is a cross sectional view showing the fuel cell stack, taken along a line IV-IV in FIG. 1.

As shown in FIGS. 2 and 4, in the first and second plates 30a, 32a of the first separator 28a, the first load absorbing mechanism 96 includes coupling members 100a, 100b fixed to the first and second fuel gas supply sections 36, 48, on surfaces thereof that are opposite to the protrusions 56, e.g., by welding. The coupling members 100a, 100b couple the fuel gas supply sections 84 of the pair of first separators 28a that are adjacent to each other in the stacking direction. The coupling members 100a, 100b have spring property for absorbing the load in the stacking direction. For example, the coupling members 100a, 100b are thin metal plates of, e.g., stainless, and have a substantially bellows shape.

As shown in FIG. 4, the coupling member 100a includes a separator joint portion 102a welded (joined) to the first fuel gas supply section 36 of the first plate 30a, an engagement portion 104a for engagement of the coupling members 100a, 100b that are adjacent to each other in the stacking direction, and a coupling portion 106a connecting the separator joint portion 102a and the engagement portion 104a. The coupling portion 106a has spring property. The coupling portion 106a is inclined in a direction away from the first fuel gas supply section 36, and the engagement portion 104a extends in a horizontal direction.

The coupling member 100b includes a separator joint portion 102b welded (joined) to the second fuel gas supply section 48 of the second plate 32a, an engagement portion 104b for engagement of the coupling members 100a, 100b that are adjacent to each other in the stacking direction, and a coupling portion 106b connecting the separator joint portion 102b and the engagement portion 104b. The coupling portion 106b has spring property. The coupling portion 106b is inclined in a direction away from the second fuel gas supply section 48, and the engagement portion 104b extends in a horizontal direction.

As shown in FIG. 2, the first load absorbing mechanism 96 includes joint members 108 for joining the pair of coupling members 100a, 100b together, and three seal members 110a, 110b and 110c are inserted at positions corresponding to an area where the coupling members 100a, 100b are engaged with each other, and areas where the coupling members 100a, 100b and the joint members 108 are engaged with each other.

The joint member 108 has a U-shape in cross section, and for example, three joint members 108 are arranged in a ring shape as a whole. As shown in FIG. 4, each of the joint members 108 is opened on the inner circumferential side, and a stack body made up of the seal member 110b, the engagement portion 104a of the coupling member 100a, the seal member 110a, the engagement portion 104b of the coupling member 100b, and the seal member 110c are inserted from this inner circumferential side to crimp these components by the joint members 108.

The seal members 110a to 110c has a ring shape, and are made of material having a gas sealing function and an insulating function, and more preferably also having heat resistance property and flexibility. Specifically, the seal members 110a to 110c are thin membrane seals of clay membrane, made of composite material of clay mineral and organic polymer. However, the present invention is not limited in this respect. For example, glass-base seal members may be used as the seal members 110a to 110c.

In the second and first plates 32b, 30b of the second separator 28b, the second load absorbing mechanism 98 includes coupling members 112a, 112b fixed to the second and first oxygen-containing gas supply sections 66, 64, on surfaces thereof that are opposite to the protrusions 56, e.g., by welding. The coupling members 112a, 112b couple the oxygen-containing gas supply sections 90 of a pair of the second separators 28b that are adjacent to each other in the stacking direction, and have spring property for absorbing the load in the stacking direction.

As shown in FIG. 4, the coupling member 112a includes a separator joint portion 114a welded (joined) to a second oxygen-containing gas supply section 66 of the second plate 32b, an engagement portion 116a for engagement of the coupling members 112a, 112b that are adjacent to each other in the stacking direction, and a coupling portion 118a connecting the separator joint portion 114a and the engagement portion 116a. The coupling portion 118a has spring property. The coupling portion 118a is inclined in a direction away from the second oxygen-containing gas supply section 66, and the engagement portion 116a extends in a horizontal direction.

The coupling member 112b includes a separator joint portion 114b welded (joined) to the first oxygen-containing gas supply section 64 of the first plate 30b, an engagement portion 116b for engagement of the coupling members 112a, 112b that are adjacent to each other in the stacking direction, and a coupling portion 118b connecting the separator joint portion 114b and the engagement portion 116b. The coupling portion 118b has spring property. The coupling portion 118b is inclined in a direction away from the first oxygen-containing gas supply section 64, and the engagement portion 116b extends in a horizontal direction.

As shown in FIG. 2, the second load absorbing mechanism 98 includes joint members 120 for joining the pair of coupling members 112a, 112b together, and three seal members 122a, 122b and 122c are inserted at positions corresponding to an area where the coupling members 112a, 112b are engaged with each other, and areas where the coupling members 112a, 112b and the joint members 120 are engaged with each other.

The joint member 120 has a U-shape in cross section, and for example, the three joint members 120 are arranged in a ring shape as a whole. As shown in FIG. 4, each of the joint members 120 is opened on the inner circumferential side, and a stack body made up of the seal member 122b, the engagement portion 116a of the coupling member 112a, the seal member 122a, the engagement portion 116b of the coupling member 112b, and the seal member 122c are inserted from this inner circumferential side to crimp these components by the joint members 120.

The seal members 122a to 122c have a ring shape, and are made of material having a gas sealing function and an insulating function, and more preferably also having heat resistance property and flexibility. Specifically, the seal members 122a to 122c are thin membrane seals of clay membrane, made of composite material of clay mineral and organic polymer. However, the present invention is not limited in this respect. For example, glass-base seal members may be used as the seal members 122a to 122c.

Operation of the fuel cell stack 10 will be described below.

Firstly, as shown in FIGS. 1 and 3, the fuel gas (hydrogen gas) is supplied to the fuel gas supply passage 34 of the fuel cell stack 10, and the oxygen-containing gas (air) is supplied to the oxygen-containing gas supply passage 62 of the fuel cell stack 10.

The fuel gas flows in the stacking direction indicated by the arrow A, and the fuel gas flows into the fuel gas supply channel 58 formed in the first separator 28a of each fuel cell 12. The fuel gas flows along the fuel gas supply channel 58 between the first and second bridges 38, 50, and the fuel gas is temporarily filled in the fuel gas filling chamber 60.

Then, the fuel gas flows through the fuel gas inlet 46 into the fuel gas channel 44. In each of the electrolyte electrode assemblies 26, the fuel gas inlet 46 is provided at a central position of the anode 24. In the structure, the fuel gas flows along the fuel gas channel 44 from the center of the anode 24 toward the outer circumferential portion of the anode 24.

On the other hand, the oxygen-containing gas supplied to the oxygen-containing gas supply passage 62 flows along the oxygen-containing gas supply channel 80 formed between the first and second bridges 68, 70 of the second separator 28b, and the oxygen-containing gas is temporarily filled in the oxygen-containing gas filling chamber 82. Then, the oxygen-containing gas flows through the oxygen-containing gas inlet 78 into the oxygen-containing gas channel 76.

In each of the electrolyte electrode assemblies 26, the oxygen-containing gas inlet 78 is provided at a central position of the cathode 22. In the structure, the oxygen-containing gas flows along the oxygen-containing gas channel 76 from the center of the cathode 22 toward the outer circumferential portion of the cathode 22.

Thus, in each of the electrolyte electrode assemblies 26, the fuel gas flows from the center to the outer circumferential portion on the electrode surface of the anode 24, and the oxygen-containing gas flows from the center to the outer circumferential portion on the electrode surface of the cathode 22. At this time, oxide ions permeate through the electrolyte 20 toward the anode 24 for generating electricity by electrochemical reactions.

The fuel gas consumed when it moved through the fuel gas channel 44, and the oxygen-containing gas consumed when it moved through the oxygen-containing gas channel 76 are discharged from the outer circumferential portion of each electrolyte electrode assembly 26, and mixed in an area around the outer circumferential portion. Then, the mixed gas is discharged as an exhaust gas having a relatively high temperature.

In the first embodiment, the first load absorbing mechanism 96 connects the fuel gas supply sections 84 of the first separators 28a that are adjacent to each other in the stacking direction and the seal members 110a to 110c together by the coupling members 100a, 100b having spring property. In the structure, since the coupling members 100a, 100b are flexibly deformed, the displacement amount in the stacking direction is absorbed.

Therefore, in the first load absorbing mechanism 96, a desired sealing performance for preventing leakage of the fuel gas is achieved. In particular, it is possible to effectively absorb rapid displacement when the temperature is increased rapidly at the time of starting operation. Thus, the first separator 28a is less subjected to deformation, and damage of the fuel gas supply section 84 can be prevented as much as possible.

Further, the load in the stacking direction can be absorbed by flexible deformation of the coupling members 100a, 100b. In the structure, dimension errors in the first separator 28a in the stacking direction can be absorbed suitably.

Further, the coupling members 100a, 100b include the separator joint portions 102a, 102b joined to the first separators 28a, the engagement portions 104a, 104b for engagement of the coupling members 100a, 100b that are adjacent to each other in the stacking direction, and the inclined coupling portions 106a, 106b connecting the separator joint portions 102a, 102b and the engagement portions 104a, 104b. The coupling portions 106a, 106b have spring property.

In the structure, in effect, since each of the coupling members 100a, 100b is a single member having a bellows shape, the coupling portions 106a, 106b having low rigidity are deformed flexibly. Therefore, the displacement amount in the stacking direction can be absorbed. Thus, with a simple and economical structure, the coupling members 100a, 100b can have a function of absorbing deformation and a function of sealing.

Further, the first load absorbing mechanism 96 has the joint member 108 for joining the pair of coupling members 100a, 100b together, and the three seal members 110a, 110b, 110c are inserted at positions corresponding to the area where the coupling members 100a, 100b are engaged with each other, and the areas where the coupling members 100a, 100b, and the joint members 108 are engaged with each other. In the structure, the pair of coupling members 100a, 100b are reliably and securely fixed, and a desired sealing performance can be achieved.

Further, the joint member 108 has a U-shape in cross section, and the three joint members 108 are arranged in a ring shape as a whole. Therefore, improvement is achieved in the performance of assembling the first load absorbing mechanism 96. Further, improvement in the sealing performance and the insulating performance can be achieved. It is sufficient that the joint members 108 are divided into a plurality of pieces. For example, the joint members 108 may be divided into four pieces.

Further, the first separator 28a and the second separator 28b has the same shape, and include the first plates 30a, 30b, and the second plates 32a, 32b that are joined together. In the structure, no dedicated separators are required for the first separator 28a and the second separator 28b. The number of components can be reduced economically.

Further, the first separator 28a has the bridge section 86 connecting the sandwiching section 88 and the fuel gas supply section 84, and the bridge section 86 has the fuel gas supply channel 58 for supplying the fuel gas from the fuel gas supply passage 34 to the fuel gas channel 44. In the structure, the bridge section 86 can divide the load applied to the sandwiching section 88 and the load applied to the fuel gas supply section 84 further reliably.

The second separator 28b has the same structure as the first separator 28a. Further, in the second load absorbing mechanism 98, the same advantages as in the case of the first load absorbing mechanism 96 are obtained.

Figure 5:
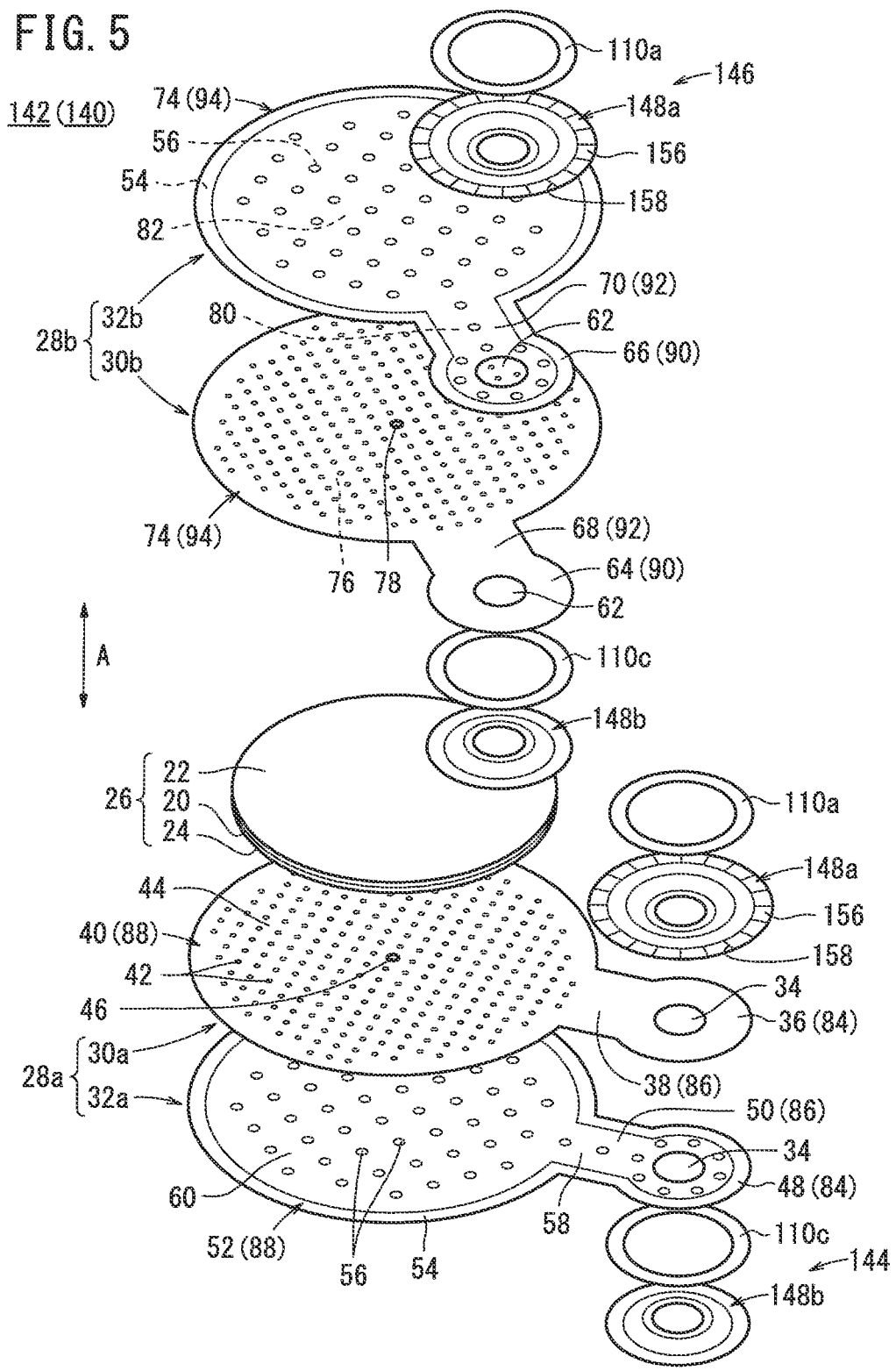
FIG. 5 is an exploded perspective view showing a fuel cell of a fuel cell stack according to a second embodiment of the present invention.

FIG. 5 is an exploded perspective view showing a fuel cell 142 of a fuel cell stack 140 according to a second embodiment of the present invention.

The constituent elements that are identical to those of the fuel cell stack 10 according to the first embodiment are labeled with the same reference numerals, and description thereof will be omitted. Also in third and other embodiments as described later, the constituent elements that are identical to those of the fuel cell stack 10 according to the first embodiment are labeled with the same reference numerals, and description thereof will be omitted.

In the fuel cell stack 140, in each of fuel gas supply sections 84 of a pair of first separators 28a that are adjacent to each other in the stacking direction indicated by the arrow A, a first load absorbing mechanism 144 for absorbing the load in the stacking direction is provided, and in each of oxygen-containing gas supply sections 90 of a pair of second separators 28b that are adjacent to each other in the stacking direction, a second load absorbing mechanism 146 for absorbing the load in the stacking direction is provided.

Figure 6:
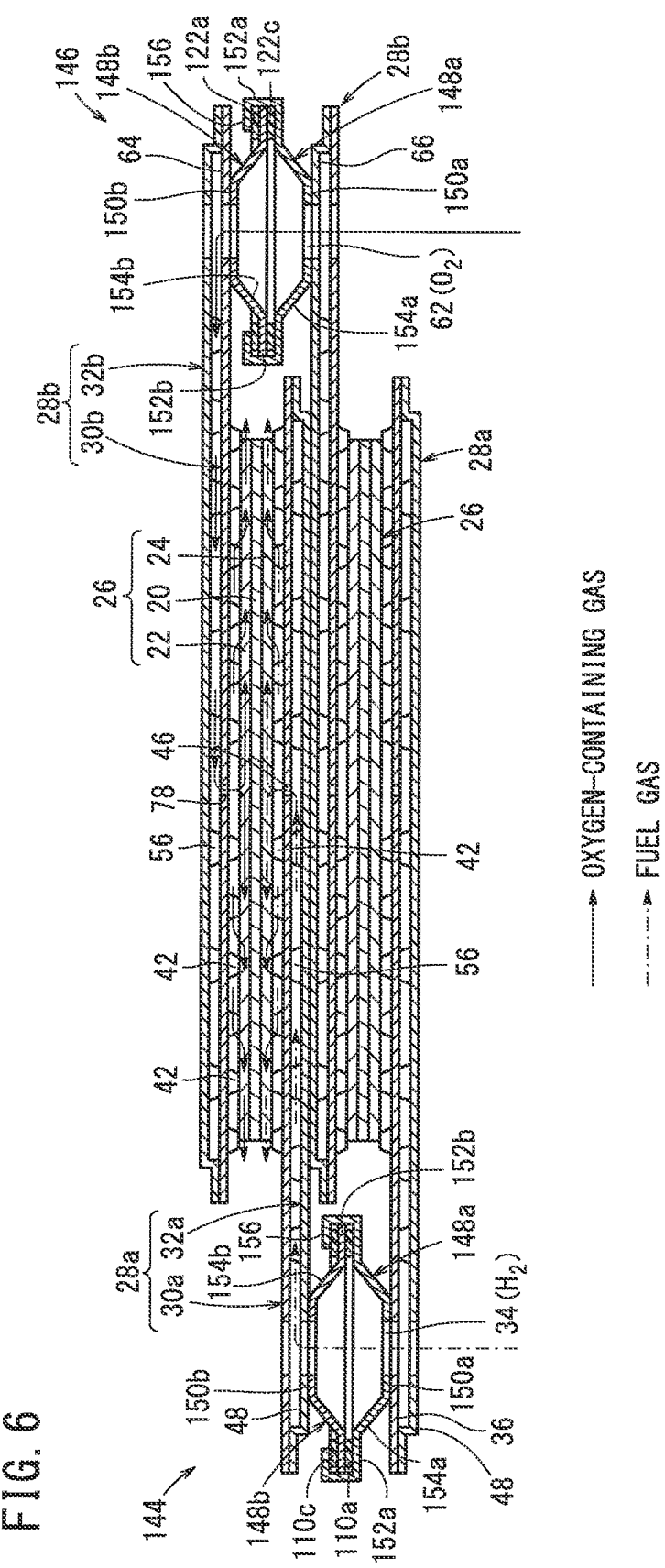
FIG. 6 is a cross sectional view showing the fuel cell stack.

As shown in FIGS. 5 and 6, the first load absorbing mechanism 144 includes a coupling member 148a joined to the first plate 30a, and a coupling member 148b joined to the second plate 32a. The diameter of the coupling member 148a is larger than the diameter of the coupling member 148b. The coupling members 148a, 148b include separator joint portions 150a, 150b coupled to the first separators 28a, engagement portions 152a, 152b for engagement of the coupling members 148a, 148b that are adjacent to each other in the stacking direction, and inclined coupling portions 154a, 154a connecting the separator joint portions 150a, 150b and the engagement portions 152a, 152b. The coupling portions 154a, 154b have spring property.

A folded portion 156 is formed integrally with the outer circumferential end of the coupling member 148a. The folded portion 156 extends outwardly from the coupling portion 154a. A plurality of slits 158 are formed in the folded portion 156 by cutting the outer circumferential end of the folded portion 156 inwardly.

As shown in FIG. 6, the folded portion 156 of the coupling member 148a is folded so as to cover the engagement portion 152b in a state where the ring-shaped seal members 110a, 110c are provided on both surfaces of the engagement portion 152b of the coupling member 148b. Thus, the pair of coupling members 148a, 148b are crimped together with the seal members 110a, 110c by the folded portion 156.

The second load absorbing mechanism 146 has the same structure as the first load absorbing mechanism 144. The constituent elements of the second load absorbing mechanism 146 that are identical to those of the first load absorbing mechanism 144 are labeled with the same reference numerals, and description thereof will be omitted.

As described above, according to the second embodiment, the folded portion 156 provided on the coupling member 148a also has a function of the joint member, and no seal member 110b is required. Thus, the number of components is reduced economically.

Figure 7:
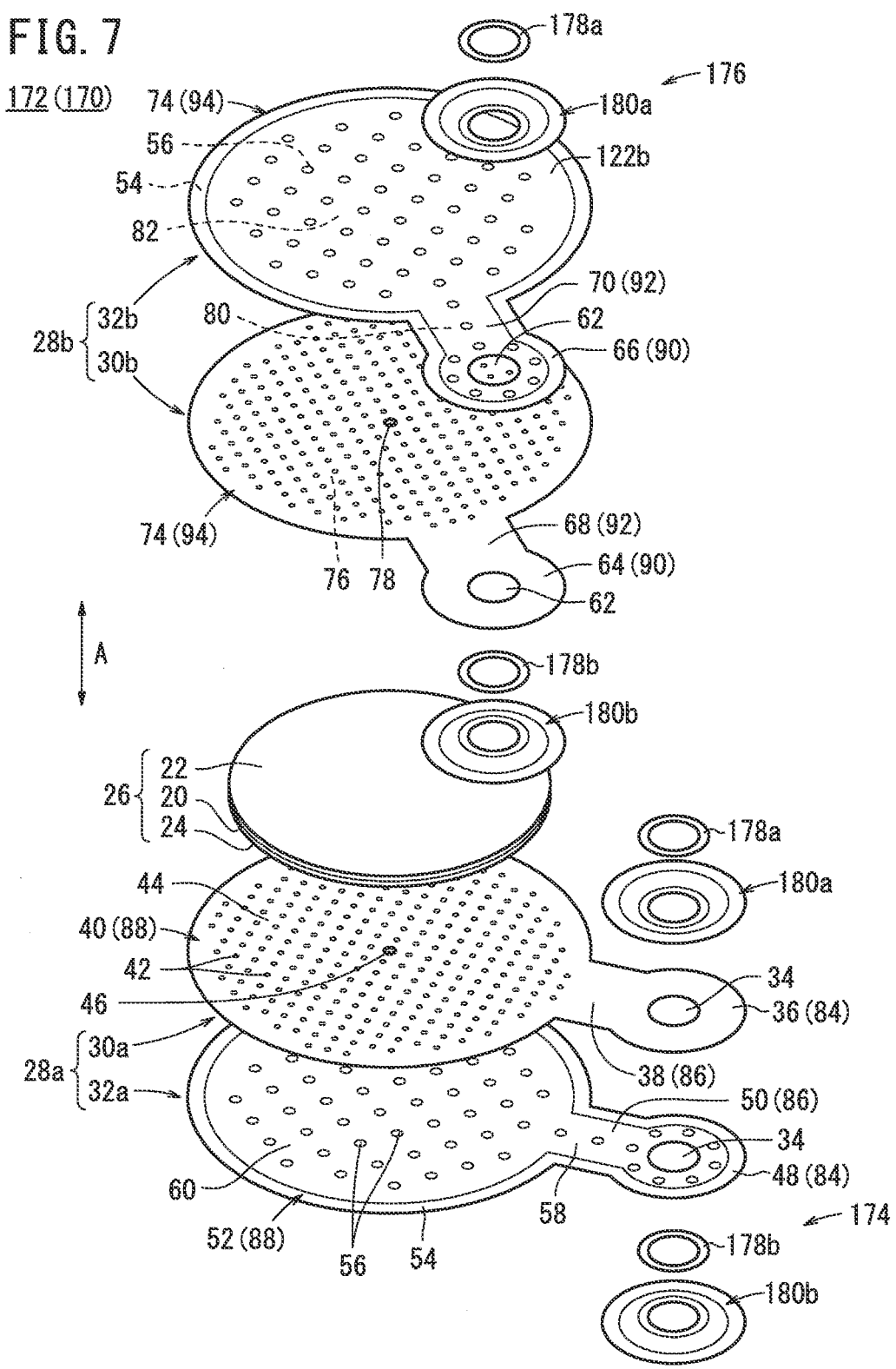
FIG. 7 is an exploded perspective view showing a fuel cell of a fuel cell stack according to a third embodiment of the present invention.

FIG. 7 is an exploded perspective view showing a fuel cell 172 of a fuel cell stack 170 according to a third embodiment of the present embodiment.

In the fuel cell stack 170, a first load absorbing mechanism 174 for absorbing the load in the stacking direction is provided on each of fuel gas supply sections 84 of a pair of first separators 28a that are adjacent to each other in the stacking direction indicated by the arrow A, and a second load absorbing mechanism 176 for absorbing the load in the stacking direction is provided on each of the oxygen-containing gas supply sections 90 of a pair of second separators 28b that are adjacent to each other in the stacking direction.

Figure 8:
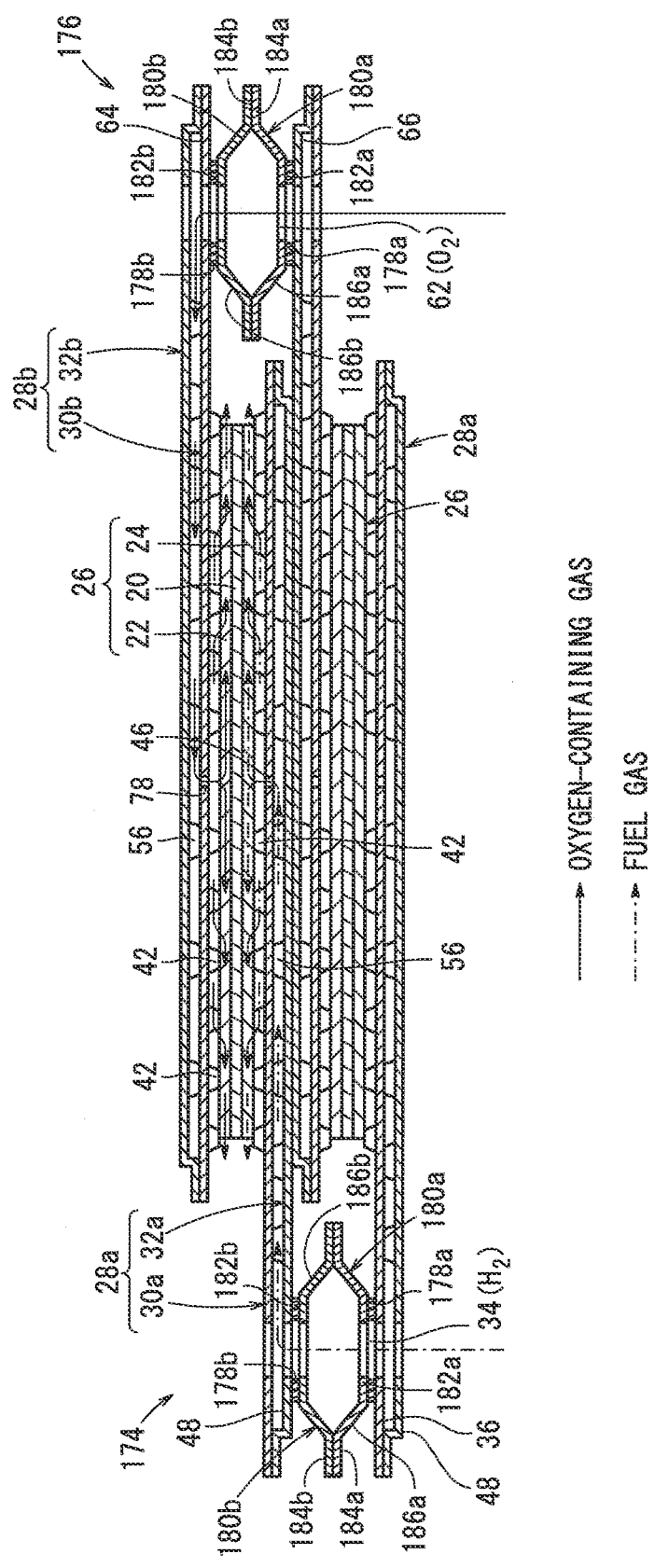
FIG. 8 is a cross sectional view showing the fuel cell stack.

As shown in FIGS. 7 and 8, in the first load absorbing mechanism 174, the first plate 30a has a coupling member 180a and the second plate 32a has a coupling member 180b. A seal member 178a having an insulating function is interposed between the first plate 30a and the coupling member 180a, and a seal member 178b having an insulating function is interposed between the second plate 32a and the coupling member 180b.

The coupling members 180a, 180b include separator joint portions 182a, 182b supported by contact with the seal members 178a, 178b, engagement portions 184a, 184b directly welded for engagement of the coupling members 180a, 180b that are adjacent to each other in the stacking direction, and inclined coupling portions 186a, 186b connecting the separator joint portions 182a, 182b and the engagement portions 184a, 184b. The coupling portions 186a, 186b have spring property.

The seal members 178a, 178b are made of material that is the same as the seal member 110a or the like, and the diameter of the seal members 178a, 178b is substantially the same as that of the separator joint portions 182a, 182b. When a load in the stacking direction is applied to the fuel cell stack 170, the seal members 178a, 178b are brought into close contact with the first separator 28a and the coupling members 180a, 180b under the pressure applied to the surfaces of these components.

The second load absorbing mechanism 176 has the same structure as the above first load absorbing mechanism 174. The constituent elements that are identical to those of the first load absorbing mechanism 174 are labeled with the same reference numerals, and description thereof will be omitted.

As described above, in the third embodiment, since the engagement portions 184a, 184b at the outer circumferential end of the pair of coupling members 180a, 180b are directly welded together, no seal members for sealing are required between the coupling members 180a, 180b. Further, the seal members 178a, 178b, which are brought into close contact under the surface pressure, are interposed only between the coupling members 180a, 180b and the first separator 28a.

In the structure, the pair of coupling members 180a, 180b can also function as joint members, and the number of required seal members is minimized (only the seal members 178a, 178b are required). Thus, the number of components is reduced economically.

Figure 9:
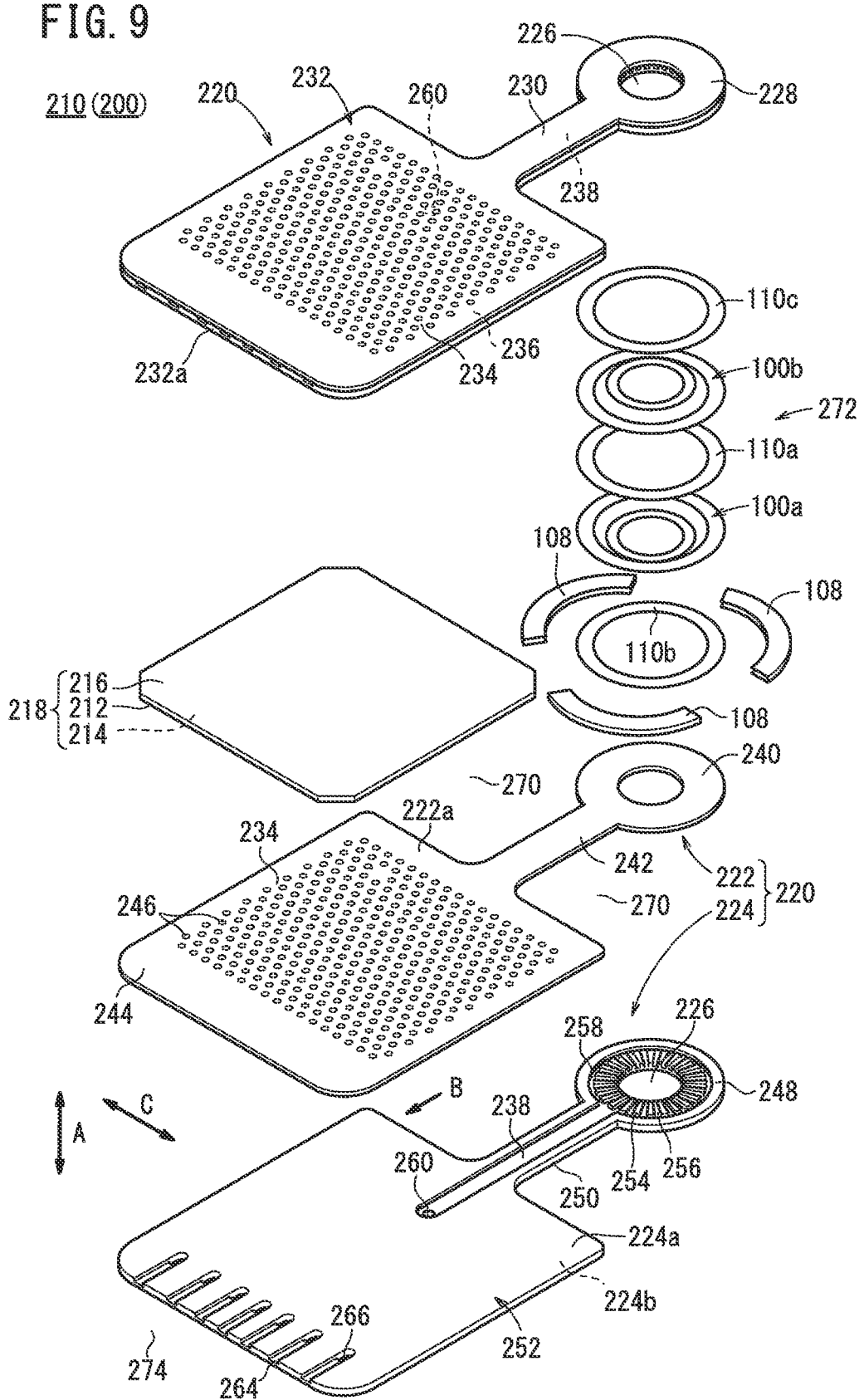
FIG. 9 is an exploded perspective view showing a fuel cell of a fuel cell stack according to a fourth embodiment of the present invention.

FIG. 9 is an exploded perspective view showing a fuel cell 210 of a fuel cell stack 200 according to a fourth embodiment of the present invention.

Figure 10:
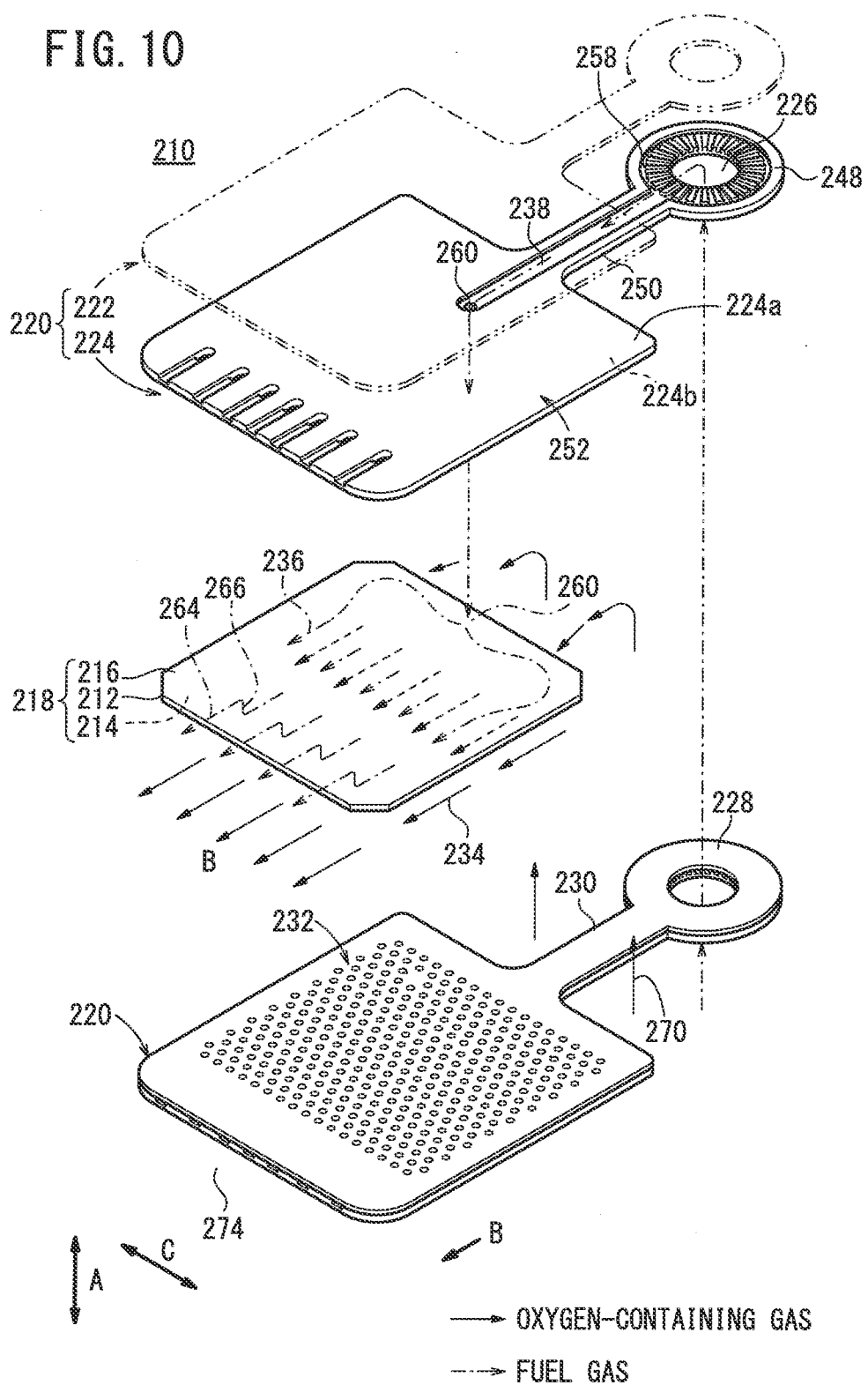
FIG. 10 is a partial exploded perspective view showing gas flows in the fuel cell.

As shown in FIGS. 9 and 10, the fuel cell 210 includes an electrolyte electrode assembly (MEA) 218. The electrolyte electrode assembly 218 includes a cathode 214, an anode 216, and, for example, a rectangular electrolyte (electrolyte plate) 212 interposed between the cathode 214 and the anode 216.

The fuel cell 210 is formed by sandwiching a single electrolyte electrode assembly 218 between a pair of separators (first and second separators) 220. The separator 220 includes a first plate 222 and a second plate 224. The first plate 222 and the second plate 224 are metal plates of e.g., stainless alloy, and joined together by brazing, diffusion bonding, laser welding, or the like.

The separator 220 includes a fuel gas supply section (reactant gas supply section) 228, and a fuel gas supply passage (reactant gas supply passage) 226 extends through the center of the fuel gas supply section 228. A rectangular sandwiching section 232 is provided integrally with the fuel gas supply section 228 through a bridge section 230 extending outwardly from the fuel gas supply section 228. The sandwiching section 232 and the electrolyte electrode assembly 218 have substantially the same size.

An oxygen-containing gas channel (reactant gas channel) 234 for supplying an oxygen-containing gas along an electrode surface of the cathode 214 is formed on the surface of the sandwiching section 232 which contacts the cathode 214. A fuel gas channel (reactant gas channel) 236 for supplying the fuel gas along the electrode surface of the anode 216 is formed on the surface of the sandwiching section 232 which contacts the anode 216 (see FIG. 9). A fuel gas supply channel 238 for supplying the fuel gas from the fuel gas supply passage 226 to the fuel gas channel 236 is formed in the bridge section 230.

As shown in FIG. 9, the first plate 222 includes a first circular disk section 240, a first elongated plate section 242 provided integrally with the first circular disk section 240, and a first rectangular section 244 provided integrally with the first elongated plate section 242. A fuel gas supply passage 226 extends through the center of the first circular disk section 240. The first rectangular section 244 has a plurality of protrusions 246 on a surface 222a of the first plate 222 facing the cathode 214. The protrusions 246 form an oxygen-containing gas channel 234.

The second plate 224 has a second circular disk section 248, a second elongated plate section 250 provided integrally with the second circular disk section 248, and a second rectangular section 252 provided integrally with the second elongated plate section 250. The fuel gas supply passage 226 extends through the center of the second circular disk section 248. On the second circular disk section 248 at a surface 224a side of the second plate 224 joined to the first plate 222, a plurality of ridges 254 are arranged in a circle so as to form slits 256 between the ridges 254. The slits 256 are connected to one end of the fuel gas supply channel 238 through a circumferential groove 258. The fuel gas supply channel 238 extends through the second elongated plate section 250, and terminates in the middle of the second rectangular section 252.

A fuel gas inlet 260 is formed in the second rectangular section 252 adjacent the terminal end of the fuel gas supply channel 238. The fuel gas inlet 260 is provided on the upstream side of the flow direction of the oxygen-containing gas indicated by the arrow B as described later, i.e., adjacent to the second elongated plate section 250.

Figure 11:
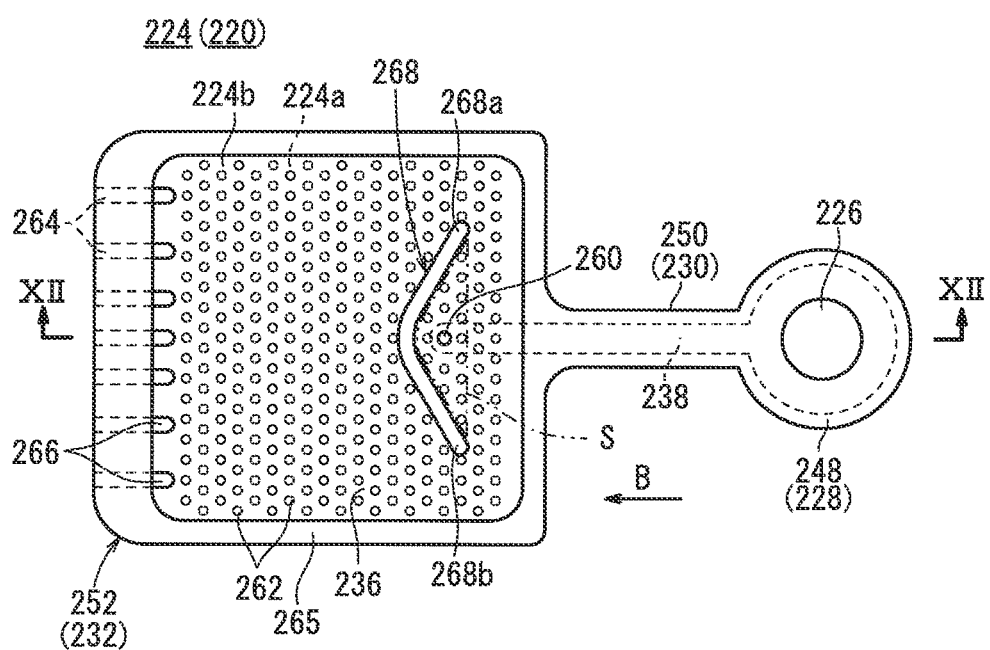
FIG. 11 is a view showing a second plate of the fuel cell.
Figure 12:
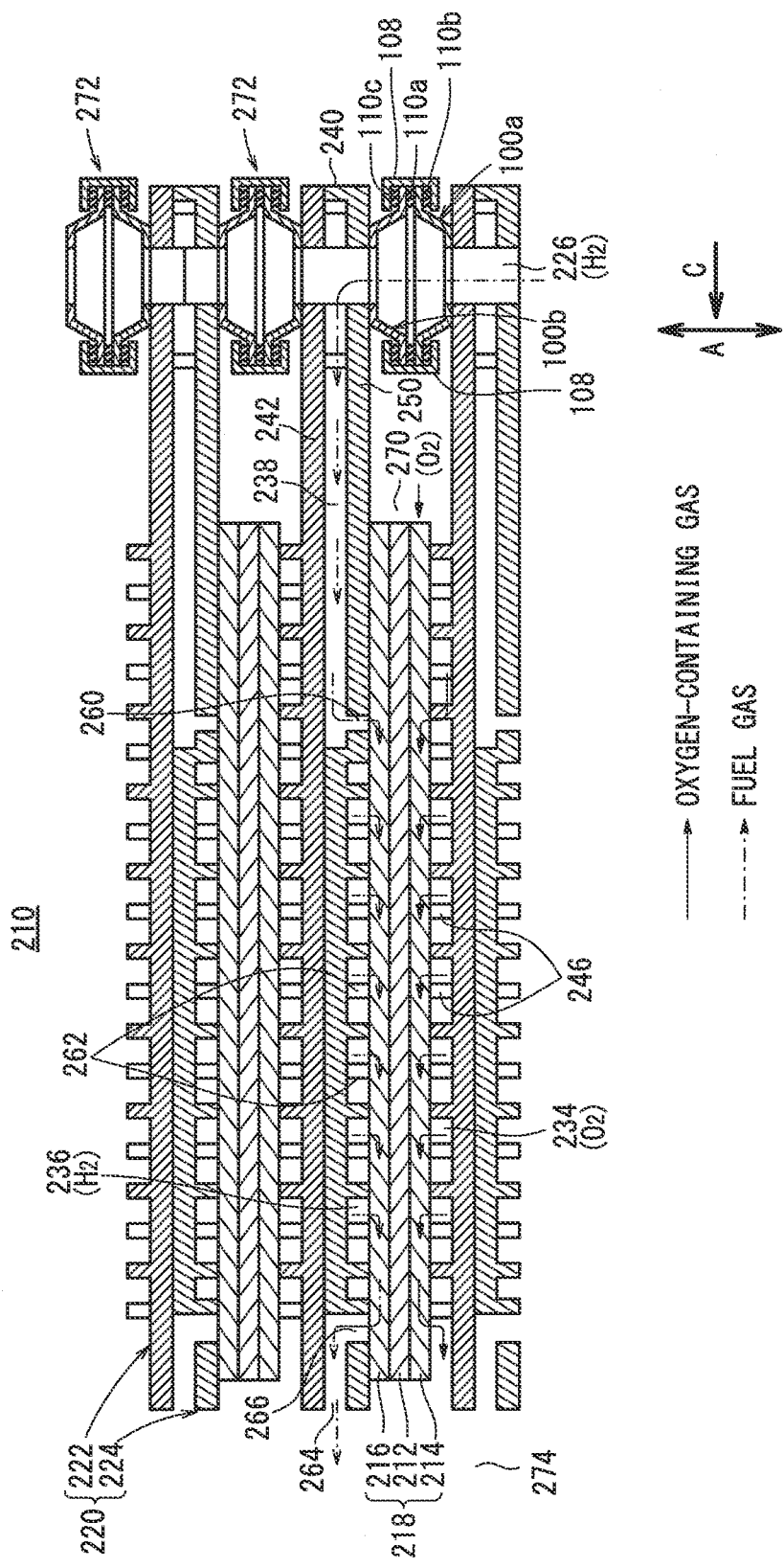
FIG. 12 is a cross sectional view showing the fuel cell, taken along a line XII-XII in FIG. 11.
Figure 13:
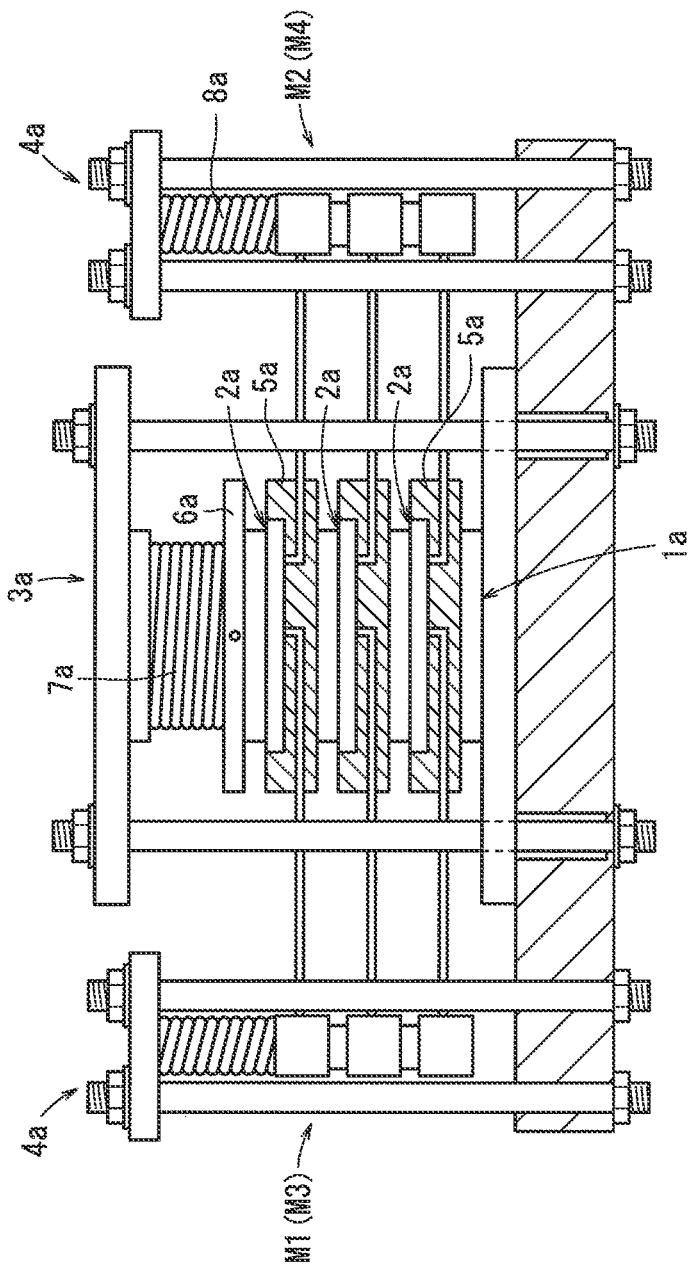
FIG. 13 is a cross sectional view showing a flat plate type solid oxide fuel cell according to Conventional Technique 1.

As shown in FIG. 11, a plurality of protrusions 262 forming the fuel gas channel 236 and an outer circumferential ridge 265 are formed on a surface 224b of the second plate 224 which contacts the anode 216. The outer circumferential ridge 265 is formed around the fuel gas channel 236, and contacts the outer circumferential end of the anode 216.

Through holes 266 connected to fuel gas outlets 264 are formed on the surface 224b for discharging the fuel gas consumed in the fuel gas channel 236. The through holes 266 are arranged in a direction perpendicular to an extension line of the second elongated plate section 250 (bridge section 230). The fuel gas outlets 264 connected to the through holes 266 are arranged on one side 232a of the sandwiching section 232 in a direction indicated by the arrow C, perpendicular to the extension line of the bridge section 230 (see FIG. 9).

As shown in FIG. 11, a detour path forming wall 268 is formed on the surface 224b between the fuel gas inlet 260 and the through holes 266 (fuel gas outlets 264) so as to contact the anode 216. The detour path forming wall 268 is bent toward the fuel gas inlet 260 in a V shape, and prevents the fuel gas from flowing straight from the fuel gas inlet 260 to the through holes 266. The detour path forming wall 268 defines a v-shaped inner area S, and the fuel gas inlet 260 is positioned in the inner area S of the detour path forming wall 268. The detour path forming wall 268 is configured such that extension lines of both wall surfaces 268a, 268b are oriented toward both corners of the sandwiching section 232.

As shown in FIGS. 9 and 10, oxygen-containing gas supply passages (reactant gas supply passage) 270 are formed on both sides of the bridge section 230, for allowing the oxygen-containing gas to flow in the direction indicated by the arrow A. The oxygen-containing gas supply passages 270 allow the oxygen-containing gas to flow in the vertical direction. The oxygen-containing gas is supplied in the direction indicated by the arrow B along the oxygen-containing gas channel 234 of each fuel cell 210 through the oxygen-containing gas supply passages 270.

The load absorbing mechanism 272 for absorbing a load applied in the stacking direction is provided in each of the fuel gas supply sections 228 of the pair of separators 220 sandwiching the electrolyte electrode assembly 218.

The load absorbing mechanism 272 have the same structure as the first load absorbing mechanism 96 of the first embodiment. The load absorbing mechanism 272 includes the coupling member 100a fixed to the first circular disk section 240 of the fuel gas supply section 228 of one separator (first separator) 220, and a coupling member 100b fixed to the second circular disk section 248 of the fuel gas supply section 228 of the other separator (second separator) 220.

The load absorbing mechanism 272 includes joint members 108 for joining the pair of coupling members 100a, 100b together, and three seal members 110a, 110b and 110c are inserted at positions corresponding to an area where the coupling members 100a, 100b are engaged with each other, and areas where the coupling members 100a, 100b and the joint members 108 are engaged with each other.

Though the first load absorbing mechanism 96 according to the first embodiment is adopted as the load absorbing mechanism 272, the present invention is not limited in this respect. For example, the first load absorbing mechanism 144 according to the second embodiment or the first load absorbing mechanism 174 according to the third embodiment may be adopted as the load absorbing mechanism 272.

An exhaust gas discharge passage 274 is formed in the fuel cell 210 outside the sandwiching section 232 in the direction indicated by the arrow B. The fuel gas and oxygen-containing gas consumed in the reaction in the electrolyte electrode assembly 218 are discharged as an exhaust gas through the exhaust gas discharge passage 274 in the stacking direction.

In the fuel cell 210, the fuel gas is supplied to the fuel gas supply passage 226, and the oxygen-containing gas is supplied to the oxygen-containing gas supply passage 270. As shown in FIGS. 9 and 10, the fuel gas supplied to the fuel gas supply passage 226 flows from the slits 256 into the circumferential groove 258 in the separator 220 of each fuel cell 210, and the fuel gas flows into the fuel gas supply channel 238 formed in the bridge section 230. The fuel gas flows from the fuel gas supply channel 238 to the fuel gas channel 236 through the fuel gas inlet 260.

As shown in FIG. 11, the fuel gas inlet 260 is provided adjacent to the bridge section 230 and in the inner area S of the detour path forming wall 268. In the structure, after the fuel gas flows from the fuel gas inlet 260 into the fuel gas channel 236, by the guidance of the detour path forming wall 268, the fuel gas flowing through the fuel gas channel 236 is supplied to the anode 216 of the electrolyte electrode assembly 218, and then, the consumed fuel gas is discharged through the through holes 266 and the fuel gas outlets 264 to the exhaust gas discharge passage 274.

As shown in FIG. 10, the air supplied to the oxygen-containing gas supply passage 270 flows into the oxygen-containing gas channel 234 formed between the cathode 214 of each electrolyte electrode assembly 218 and the surface 222a of the separator 220. The oxygen-containing gas moves through the oxygen-containing gas channel 234 in the direction indicated by the arrow B. Then, the oxygen-containing gas is supplied to the cathode 214 of the electrolyte electrode assembly 218, and discharged into the exhaust gas discharge passage 274.

Thus, in the electrolyte electrode assembly 218, the fuel gas is supplied to the anode 216, and the air is supplied to the cathode 214. At this time, oxide ions permeate through the electrolyte 212 toward the anode 216 for generating electricity by the electrochemical reactions.

In the fourth embodiment, in each of the fuel gas supply sections 228 of the pair of separators 220 sandwiching the electrolyte electrode assembly 218, the load absorbing mechanism 272 for absorbing a load applied in the stacking direction is provided. The first load absorbing mechanism 96 is adopted as this load absorbing mechanism 272.

Thus, the same advantages as in the case of the first embodiment are obtained. For example, a desired sealing performance for preventing leakage of the fuel gas is achieved. In particular, it is possible to effectively absorb rapid displacement when the temperature is increased rapidly at the time of starting operation, and damage of the fuel gas supply section 228 can be prevented as much as possible.

Although certain preferred embodiments of the present invention have been shown and described in detail, it should be understood that various changes and modifications may be made to the embodiments without departing from the scope of the invention as set forth in the appended claims.

The invention claimed is:

1. A fuel cell stack formed by stacking a plurality of fuel cells in a stacking direction, the fuel cells each being formed by sandwiching an electrolyte electrode assembly between a first separator and a second separator, the electrolyte electrode assembly including an anode, a cathode, and an electrolyte interposed between the anode and the cathode, wherein at least the first separator includes:
a sandwiching section for sandwiching the electrolyte electrode assembly, a reactant gas channel for supplying a reactant gas along an electrode surface being formed in the sandwiching section;
a reactant gas supply section, a reactant gas supply passage for supplying the reactant gas to the reactant gas channel extending through the reactant gas supply section in the stacking direction; and
a load absorbing mechanism provided in the reactant gas supply section for absorbing a load applied in the stacking direction, and wherein the load absorbing mechanism includes:
a pair of coupling members for coupling a pair of the reactant gas supply sections that are adjacent to each other in the stacking direction and through which the reactant gas flows, the coupling members having spring property for absorbing the load applied in the stacking direction; and
a seal member for preventing leakage of the reactant gas from the reactant pas supply section, and
wherein outer dimensions of one of the pair of coupling members are larger than outer dimensions of the other of the pair of coupling members;
the outer circumferential end of the one of the pair of coupling members is folded so as to cover the outer circumferential end of the other of the pair of coupling members which is interposed between a pair of the seal members, thereby to join the pair of coupling members and the pair of seal members together.

2. A fuel cell stack formed by stacking a plurality of fuel cells in a stacking direction, the fuel cells each being formed by sandwiching an electrolyte electrode assembly between a first separator and a second separator, the electrolyte electrode assembly including an anode, a cathode, and an electrolyte interposed between the anode and the cathode, wherein at least the first separator includes:
a sandwiching section for sandwiching the electrolyte electrode assembly, a reactant gas channel for supplying a reactant gas along an electrode surface being formed in the sandwiching section;
a reactant gas supply section, a reactant gas supply passage for supplying the reactant gas to the reactant gas channel extending through the reactant gas supply section in the stacking direction; and
a load absorbing mechanism provided in the reactant gas supply section for absorbing a load applied in the stacking direction, and wherein the load absorbing mechanism includes:
a pair of coupling members for coupling a pair of the reactant gas supply sections that are adjacent to each other in the stacking direction and through which the reactant gas flows, the coupling members having spring property for absorbing the load applied in the stacking direction; and a seal member for preventing leakage of the reactant gas from the reactant pas supply section, and wherein in the load absorbing mechanism, the outer circumferential ends of the pair of coupling members are directly joined to each other, and the seal member is interposed between each of the coupling members and the first separator.

3. The fuel cell stack according to claim 1, wherein the first separator and the second separator have the same shape, and each of the first separator and the second separator includes a first plate and a second plate which are joined together.

4. The fuel cell stack according to claim 1, wherein at least the first separator further includes a bridge section connecting the sandwiching section and the reactant gas supply section, and a reactant gas supply channel for supplying the reactant gas from the reactant gas supply passage to the reactant gas channel is formed in the bridge section.

5. The fuel cell stack according to claim 1, wherein the first separator includes a fuel gas supply section as the reactant gas supply section through which a fuel gas as one reactant gas flows; the second separator includes an oxygen-containing gas supply section through which an oxygen-containing gas as another reactant gas flows; and the load absorbing mechanism includes: a fuel gas side load absorbing mechanism for coupling a pair of the fuel gas supply sections that are adjacent to each other in the stacking direction; and an oxygen-containing gas side load absorbing mechanism for coupling a pair of the oxygen-containing gas supply sections that are adjacent to each other in the stacking direction.

6. The fuel cell stack according to claim 1, wherein the load absorbing mechanism further includes a joint member for joining the pair of coupling members together; and the seal members are inserted in an area where the pair of coupling members are engaged with each other and areas where the pair of coupling members are engaged with the joint member.

7. The fuel cell stack according to claim 2, wherein the first separator and the second separator have the same shape, and each of the first separator and the second separator includes a first plate and a second plate which are joined together.

8. The fuel cell stack according to claim 2, wherein at least the first separator further includes a bridge section connecting the sandwiching section and the reactant gas supply section, and a reactant gas supply channel for supplying the reactant gas from the reactant gas supply passage to the reactant gas channel is formed in the bridge section.

9. The fuel cell stack according to claim 2, wherein the first separator includes a fuel gas supply section as the reactant gas supply section through which a fuel gas as one reactant gas flows; the second separator includes an oxygen-containing gas supply section through which an oxygen-containing gas as another reactant gas flows; and the load absorbing mechanism includes: a fuel gas side load absorbing mechanism for coupling a pair of the fuel gas supply sections that are adjacent to each other in the stacking direction; and an oxygen-containing gas side load absorbing mechanism for coupling a pair of the oxygen-containing gas supply sections that are adjacent to each other in the stacking direction.

10. The fuel cell stack according to claim 2, wherein the load absorbing mechanism further includes a joint member for joining the pair of coupling members together; and the seal members are inserted in an area where the pair of coupling members are engaged with each other and areas where the pair of coupling members are engaged with the joint member.

* * * * *